US009230160B1

(12) United States Patent
Kanter

(10) Patent No.: US 9,230,160 B1
(45) Date of Patent: Jan. 5, 2016

(54) METHOD, MEDIUM, AND SYSTEM FOR ONLINE ORDERING USING SIGN LANGUAGE

(75) Inventor: Max L. Kanter, Redmond, WA (US)

(73) Assignee: Amazon Technologies, Inc., Reno, NV (US)

( * ) Notice: Subject to any disclaimer, the term of this patent is extended or adjusted under 35 U.S.C. 154(b) by 459 days.

(21) Appl. No.: 13/595,384

(22) Filed: Aug. 27, 2012

(51) Int. Cl.
*G06Q 30/00* (2012.01)
*G06K 9/00* (2006.01)

(52) U.S. Cl.
CPC .................................. *G06K 9/00355* (2013.01)

(58) Field of Classification Search
CPC ................. G06K 9/00355; G05B 2219/40152
USPC ................................................. 705/26.1, 27.1
See application file for complete search history.

(56) References Cited

U.S. PATENT DOCUMENTS

| 5,953,693 | A * | 9/1999 | Sakiyama | G06F 3/017 340/4.13 |
| 6,173,266 | B1 * | 1/2001 | Marx | G10L 15/22 704/270 |
| 6,275,229 | B1 * | 8/2001 | Weiner | G06F 17/30905 345/440 |
| 7,062,561 | B1 * | 6/2006 | Reisman | 709/227 |
| 2008/0059578 | A1 * | 3/2008 | Albertson | G06F 3/016 709/204 |
| 2010/0217685 | A1 * | 8/2010 | Melcher | G06F 3/04883 705/26.1 |
| 2011/0248914 | A1 * | 10/2011 | Sherr | G06F 3/014 345/156 |
| 2011/0301934 | A1 * | 12/2011 | Tardif | 704/1 |

OTHER PUBLICATIONS

Brashear, Helene, et al. "Using multiple sensors for mobile sign language recognition." (2003).*

* cited by examiner

*Primary Examiner* — Matthew Zimmerman
(74) *Attorney, Agent, or Firm* — Athorus, PLLC

(57) ABSTRACT

With a sign language computer interface, a user may perform one or more gestures in accordance with a recognized sign language, and have the gestures translated into information or instructions for use by one or more computers. Such interfaces may capture video imagery of a user performing gestures using one or more cameras, sense the gestures expressed in the video imagery, search a library for phrases corresponding to the gestures, and display one or more of the phrases to the user, who may indicate whether the phrases are consistent with his or her intended communication. The interfaces permit a user to communicate with computer-based systems the exclusive use of gestures, and without a single keystroke or mouse click.

23 Claims, 8 Drawing Sheets

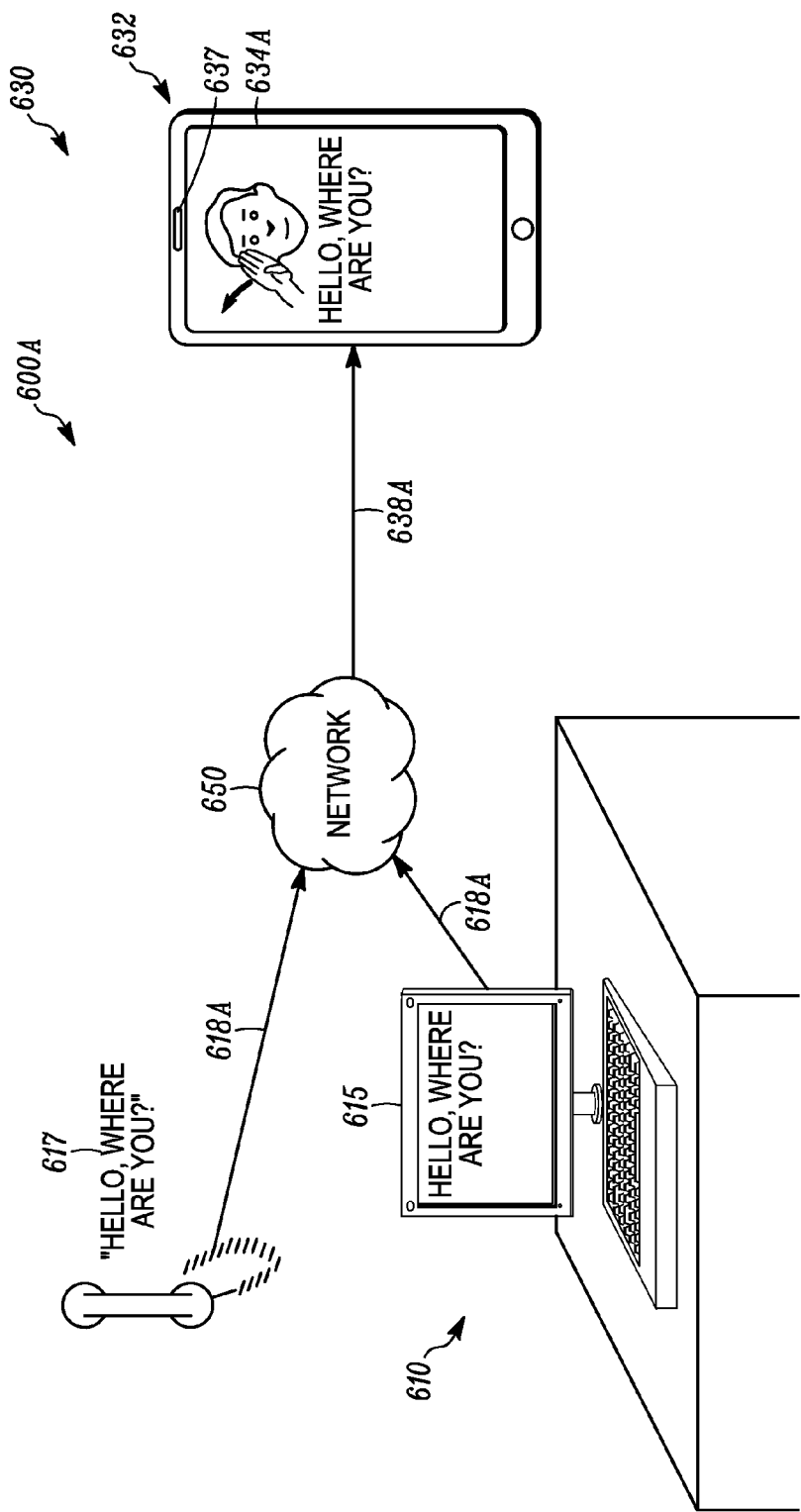

METHOD, MEDIUM, AND SYSTEM FOR ONLINE ORDERING USING SIGN LANGUAGE

BACKGROUND

The Internet has revolutionized the way individuals communicate with one another, particularly in the field of electronic commerce, where the marketing and sales of goods and services have become increasingly interactive. For example, a prospective customer may access the Internet to search for or browse through items or categories of items that may be available at an online marketplace, and the online marketplace may provide information to the prospective customer over the Internet regarding one or more items as he or she contemplates making a purchase. In order to obtain information regarding items or categories of items over the Internet, customers usually provide keywords or other data to online marketplaces through text-based (i.e., by typing words or phrases into text boxes) or audio-based (i.e., by providing spoken words or phrases to the online marketplace through telephonic communications or speech recognition software) interfaces, and such keywords or data are then transferred through one or more applications to an online marketplace over the Internet. Reciprocally, the online marketplace interprets such keywords or data provided by the customer, and, in response, transfers information pertaining to such keywords or data to the customer in the form of web pages or other files containing text, images, audio or video content over the Internet for display by one more applications, such as web browsers.

As Internet access and functionality have improved, and as the level of sophistication of Internet programming has advanced, the percentage of Internet sites that provide video capabilities to users has increased dramatically. Today, many commercial services such as Skype® or Google Talk® enable video chatting between users over the Internet, including real-time or near-real-time audio and video communication functions. Additionally, online video-sharing sites such as YouTube® or Hulu® enable users to download desired audio and video files over the Internet; it is estimated that nearly one billion unique users download over three billion hours of video content from YouTube® alone each month. Moreover, the capacity of computer software and hardware to capture and interpret video and audio content has also improved. For example, facial recognition applications are frequently utilized for security monitoring, even in large and rapidly changing environments such as airports and stadiums, and license plate capturing software is regularly used for the enforcement of parking and traffic regulations, even where the tracking platforms, or the vehicles being tracked, are traveling at high rates of speed.

Despite the evolution of Internet communications, particularly regarding the use of video technology, existing systems and methods for communicating over the Internet are typically limited to communications containing written (i.e., text- or character-based) or oral (i.e., audio and/or video files) content, expressed in one or more languages that may be typed or spoken. Such systems and methods, however, are unable to enable users to communicate through the use of sign languages, which serve as the primary communications channel for the hearing impaired, as well as small children who have yet to master the arts of oral or written communication.

Although existing computer-based communications systems and methods enable users to transmit messages including typed, text-based words or phrases, or acoustic signals that may be translated or dissected into text-based words or phrases, it is believed that no known systems or methods for communicating over the Internet are able to sense a user's motions, gestures and/or mannerisms in accordance with a recognized sign language (i.e., such as expressions of letters, words or phrases), to convert such motions into tangible computer instructions or information, and to transmit a message containing such instructions or information to a server or other computer-related machine. Similarly, it is also believed that no known systems and methods may translate a message consisting of typed words or acoustic signals into a video file or other form of media containing expressions of computer-generated responses in accordance with a recognized sign language. Because sign languages are the primary means of communication for large segments of the population, the many benefits of the Internet, particularly the advantages and improvements to electronic commerce provided by the Internet, are foreclosed to the hearing impaired, small children and others who communicate exclusively in sign language, or are unable to communicate in text-based or oral forms.

BRIEF DESCRIPTION OF THE DRAWINGS

FIGS. 6A and 6B are flow diagrams of communications by way of sign language computer interfaces, in accordance with embodiments of the present disclosure.

DETAILED DESCRIPTION

As is set forth in greater detail below, the present disclosure is directed to systems and methods for facilitating communications between computer users through one or more sign language computer interfaces. Specifically, the present disclosure describes systems and methods that enable users to communicate with computer-based systems through motions, gestures and/or mannerisms, such as those that are compliant or consistent with a recognized sign language, which may be captured in the form of video imagery and interpreted into relevant information and/or instructions by such computer-based systems. Additionally, such computer-based systems may then take one or more actions upon receiving the information and/or instructions, and may deliver or present one or more messages to the users, including text-based, audio or video-based content, or even video imagery containing one or more sign language gestures that may be recognized by the user. Effectively, the systems and methods of the present disclosure enable users to communicate with computer-based systems through the exclusive use of motions, gestures and/or mannerisms, and without a single keystroke or mouse click.

Figure 1A:
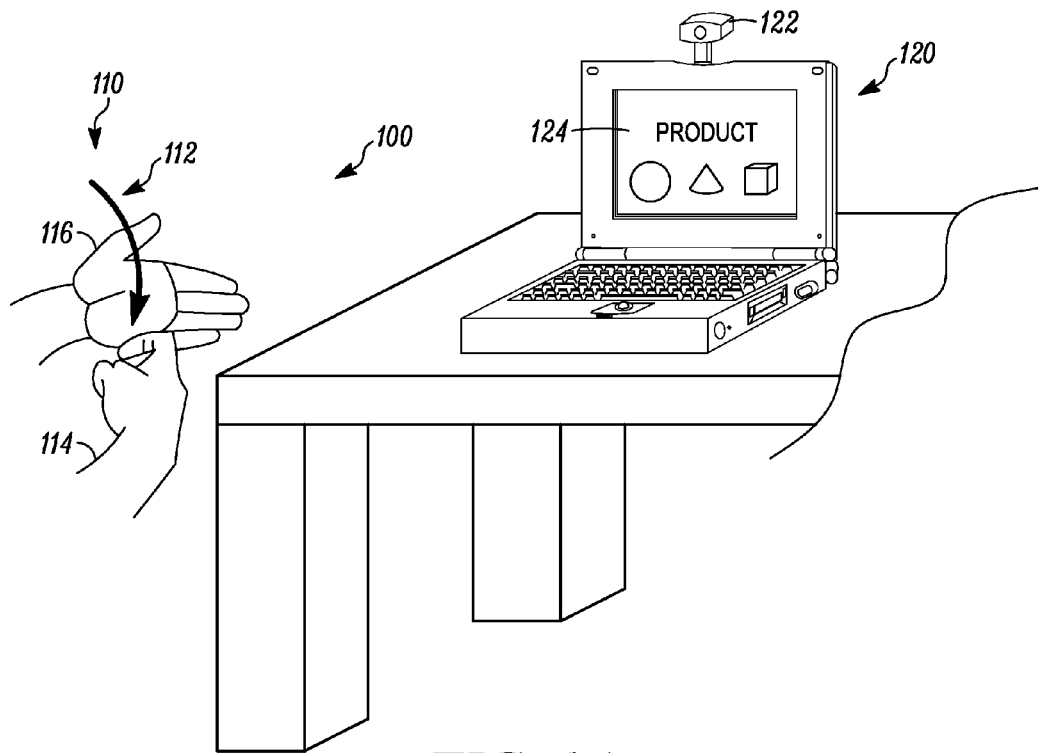
FIGS. 1A and 1B are perspective views showing a human user interacting with a sign language computer interface, in accordance with embodiments of the present disclosure.
Figure 1B:
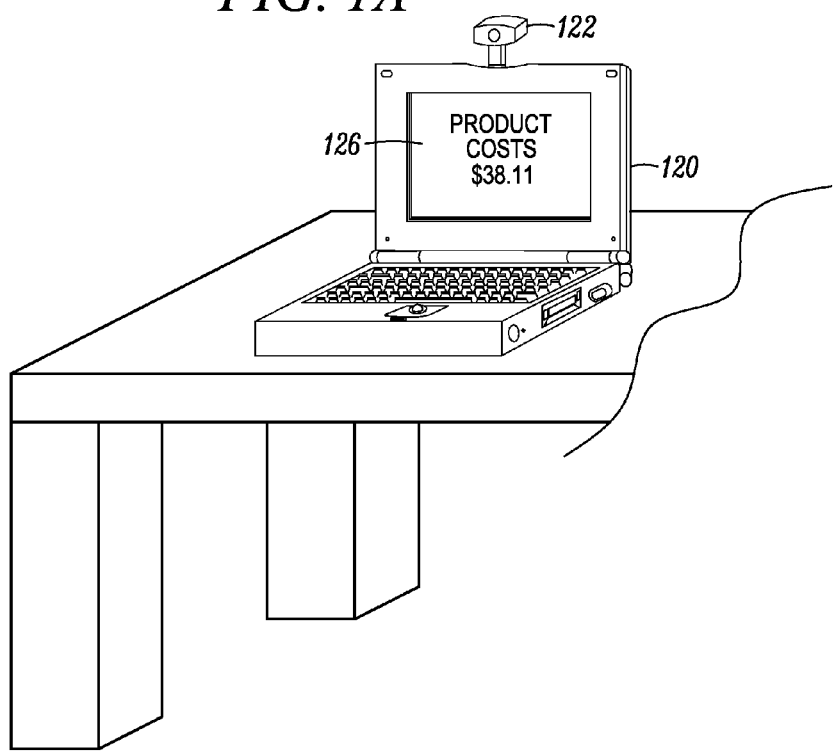

The systems and methods disclosed herein may complement any existing computer-based systems or methods for electronic communication, particularly those utilized in the field of electronic commerce. Referring to FIGS. 1A and 1B, one such system 100 may enable a user 110 to communicate with an online marketplace through one or more gestures, using a video-enabled computer 120. As is shown in FIG. 1A, the user 110 is reviewing information regarding a product as displayed at a first web page 124 of an online marketplace using a computer 120 that includes a camera 122. The user 110 may perform a gesture 112, such as by expressing the word "COST" using hands 114, 116, i.e., by raking the middle phalanx of the index finger of the right hand 114 across the palm of the left hand 116. Video imagery including the gesture 112 may be captured by the computer 120, and the gesture 112 may be translated into a standard language (i.e., English) and/or format that may be recognized by the computer 120 and/or the online marketplace. As is shown in FIG. 1B, the online marketplace may then display a second web page 126 reflecting the cost of the product, in response to the gesture 112 performed by the user 110.

Thus, according to the systems and methods of the present disclosure, a user may perform one or more motions, gestures and/or mannerisms that may be sensed or captured via a video camera and analyzed by one or more computers and/or computer processors. The motions, gestures and/or mannerisms included in video imagery may then be converted into or otherwise treated as signals or instructions by the one or more computers and/or computer processors, such as by comparing the sensed or captured motions, gestures and/or mannerisms to those motions, gestures and/or mannerisms associated with various pertinent words or phrases in accordance with one or more recognized languages, which may be stored in a library, dictionary, data store or other pertinent resource. The most appropriate words or phrases may be determined by any standard means, such as by calculating a confidence level or factor associated with the sensed or captured motions, gestures and/or mannerisms with respect to one or more motions, gestures and/or mannerisms stored in the library or data store. One or more potentially matching words or phrases may be identified based on the confidence level or factor and displayed to the user, who may either confirm that the potentially matching words or phrases correspond to his or her intended communication, or indicate that the potential matches do not correspond to his or her intended communication.

Such systems and methods may further include learning or self-teaching tools, such as machine language tools or algorithms, to continuously refine the accuracy and precision with which a motion, gesture and/or mannerism may be identified from a video message, and with which a potentially matching phrase corresponding to the motion, gesture and/or mannerism may be identified, for a particular user or for a particular context of a communication. For example, where a particular user indicates that a potentially matching word or phrase does, or does not, correspond with his or her intended communication, the tools or algorithms may be updated to reflect the accuracy of the suggestion with respect to the particular user or the particular context in which the communication was made.

According to one embodiment of the present disclosure, a customer who is visiting an online marketplace using a computer equipped with a video camera may be prompted to provide a response to a query from the online marketplace (i.e., a request for a name of an item or category of item) that may be displayed on a web page hosted by the online marketplace. Instead of typing a response to the query, the customer may perform one or more motions, gestures and/or mannerisms within the field of view of the camera. The motions, gestures and/or mannerisms may then be interpreted or otherwise translated into one or more words or phrases in accordance with one or more recognized sign languages. Such words or phrases may be transferred to the online marketplace as the customer's response to the query, and acted upon by the online marketplace. For example, where a customer is reviewing product details regarding a particular article of clothing, and is asked to provide the online marketplace with a desired size, he or she may perform gestures and mannerisms associated with the word "LARGE," such as by forming the letter L with his or her thumb and index fingers on each hand, curling the middle, ring and pinky fingers of each hand toward the palms of the respective hands, bringing each of the respective hands together in front of and the center of his or her torso with the palms facing one another and drawing the hands apart to about his or her shoulder width, while forming the word "CHA" with his or her mouth. The camera then records the customer's gestures, motions and/or mannerisms, and the computer translates the sensed motions, gestures and/or mannerisms into the word "LARGE," and interprets this word as the customer's response to the size query. The online marketplace may then process an order for the article, size large, in accordance with the customer's request.

According to another embodiment of the present disclosure, a customer visits an online marketplace to purchase a new stroller using a laptop having a built-in camera installed within a frame that surrounds the laptop's screen. The online marketplace recognizes the customer as having previously purchased a variety of baby products in the past. The customer is then prompted to enter one or more keywords into a search box. Rather than typing words into the search box, the customer instead performs gestures and mannerisms corresponding with the word "STROLLER," by forming both of his or her hands into fists extended approximately one foot in front of his or her chest with a common, horizontal axis that is parallel to the ground, approximately nine inches apart, and moving her fists forward as if she were pushing a stroller. The online marketplace then recognizes the customer's gestures and mannerisms as consistent with the words "STROLLER" and "LAWNMOWER," in accordance with the American Sign Language. Because the customer has established a history of purchasing baby-related products from the online marketplace, the customer's gestures and mannerisms are understood to correspond with the word "STROLLER," and the online marketplace then displays information relating to a variety of strollers and/or stroller accessories for review by the customer. If the customer had established a history of purchasing home and garden related products, the online marketplace would have interpreted these gestures to correspond with the word "LAWNMOWER," however.

According to yet another embodiment of the present disclosure, a hearing-impaired customer named Ed contacts a "call center" to request customer service using his or her smartphone, which is equipped with a built-in camera for video chatting and other purposes. The call center is able to receive real-time video requests for assistance expressed in gestures and/or mannerisms that are recognized by the American Sign Language, in accordance with the systems and methods of the present disclosure. Therefore, although the customer is unable to communicate in any orally discernible manner over telephonic means, the customer is thus able to request assistance from the call center by performing gestures and mannerisms in sign language within the field of view of the camera, and to transmit either a video representation of such gestures and mannerisms or a translation thereof to the call center over a network, such as the Internet.

For example, the customer may first open one hand and flatten the thumb fingers of that hand in parallel and within a plane of the palm of that hand (viz., a "flat hand"), before raising the hand to his face such that the palm of the hand faces forward and the thumb of the hand touches a side of his face, before pushing the hand and outward, to form the word "HELLO." Next, the customer may spell each of the letters of his or her name (e.g., by bending the thumb of one hand across the palm of that hand and curling the four fingers downward such that the tips tough the thumb, to form the letter "E," and by curling the middle, ring and pinky fingers of that hand downward to touch the tip of the thumb while extending the index finger vertically upward, to form the letter "D"). Then, the customer may form a "flat hand" with his right hand, and place the flat right hand over his heart, to form the word "MY." Finally, the customer may form "flat hands" with the thumbs and fingers of each of his hands before crossing the parallel, erect fingers of the flat right hand onto the parallel, erect fingers of the flat left hand, to form the word "NAME." The customer's gestures and mannerisms are then transferred to the call center through a standard video chatting system, and are translated by the call center to mean, "Hello, my name is Ed." The call center operator, who need not herself be trained to communicate in American Sign Language, can then respond to Ed's request by typing or speaking the words, "hello, Ed, how may we help you?" which may then be displayed on the screen of Ed's smartphone in text, or shown in the form of pre-recorded video gestures which express the operator's response in accordance with American Sign Language. Therefore, even if the call center operator is not trained to communicate in sign language, the call center operator may still provide customer service to the hearing impaired or others who request service through the use of American Sign Language gestures and/or mannerisms.

Accordingly, the systems and methods of the present disclosure enable users to functionally communicate with and through computer-based systems using motions, gestures and/or mannerisms, such as those that are recognized by one or more sign languages. The systems and methods of the present disclosure operate by sensing or capturing one or more motions, gestures and/or mannerisms in video imagery; comparing the sensed motions, gestures and/or mannerisms expressed in the video imagery to those that may be recognized in accordance with one or more sign languages as associated with particular words or phrases; identifying one or more potentially matching words or phrases corresponding to the sensed motions, gestures and/or mannerisms; and displaying the one or more potentially matching words or phrases to users, sorted or listed in accordance with a confidence formula or other relevance ranking.

In such a manner, users may incorporate the motions, gestures and/or mannerisms of a recognized sign language into existing computer-based systems and methods for electronic communication, which generally operate using text-based entries or verbal cues that may be translated or recognized and converted to text-based entries, thereby improving the access to and utility of such computer-based systems and methods for those who communicate in sign language, such as the hearing impaired or small children. Users of systems and methods of the present disclosure are therefore able to communicate with computer-based systems and methods through the exclusive use of motions, gestures and/or mannerisms, and without a keyboard or other communication device, such as a mouse.

Sign languages are comprehensive communications systems that share many of the essential properties of oral or written languages. Those who communicate using sign languages create and interpret visual patterns that are constructed from multiple sources, including movements of the hands, expressions of the face (such as movements of the eyes, cheeks or mouth) and other types of body language or motions that may be executed for the purpose of expressing a message. Like words in an oral or written language, such movements, body language and expressions of a sign language may be conventional and arbitrary, and need not have any inherent relationship with the words or phrases to which they refer. Also like oral or written languages, sign languages may be used to communicate in various levels of complexity, from basic to intricate, and may include a variety of means for presenting iconicity within the expressed speech.

There are numerous sign languages in use around the world, many of which originated or evolved at educational facilities for the deaf. The most common sign language presently in use in the United States, known as the American Sign Language, likely dates to the founding of what is now known as the American School for the Deaf in Hartford, Conn., by Thomas H. Gallaudet and Laurent Clerc in 1817. Several other sign languages are used in other countries, but are often not directly related to languages that may be spoken or written in each country. For example, American Sign Language and British Sign Language are significantly different from one another, despite the fact that the most common language spoken and written in both Britain and the United States is English.

Motions, gestures and/or mannerisms may be captured from video imagery and analyzed by one or more standard techniques. Most video content exists as a series of frames, and action or motion may be sensed and detected through an analysis of one frame to another, such as by processing frames through various algorithms or filters to identify changes in color or intensity between the frames. For example, consecutive frames within video imagery may be analyzed to determine whether any motion is present between the two frames. Similarly, any one frame recorded at a second time $T_2$ may be compared to a first frame recorded at time $T_1$ and analyzed to determine a net level of motion between the frames between time $T_1$ and time $T_2$. Such an analysis may be simplified or enhanced by determining a background of the frames and analyzing changes in activity within the frames with respect to the background.

In accordance with the systems and methods of the present disclosure, video imagery may be captured through the use of one or more standard cameras. For example, many computer systems include built-in cameras as standard features, while many external cameras, such as "web cams," are available as relatively inexpensive peripherals that may operate in a standalone format or may be attached or associated with one or more computers through wired (e.g., Universal Series Bus, or USB, connections) or wireless (e.g., Wireless Fidelity, or "WiFi," or Bluetooth telecommunication equipment). Moreover, video may be captured through single cameras, or through multiple cameras, which may enable the systems and methods of the present disclosure to obtain a fuller account of a user's motions, gestures and/or mannerisms, such as by performing a stereoscopic analysis of multiple perspectives of a user's actions.

Figure 2:
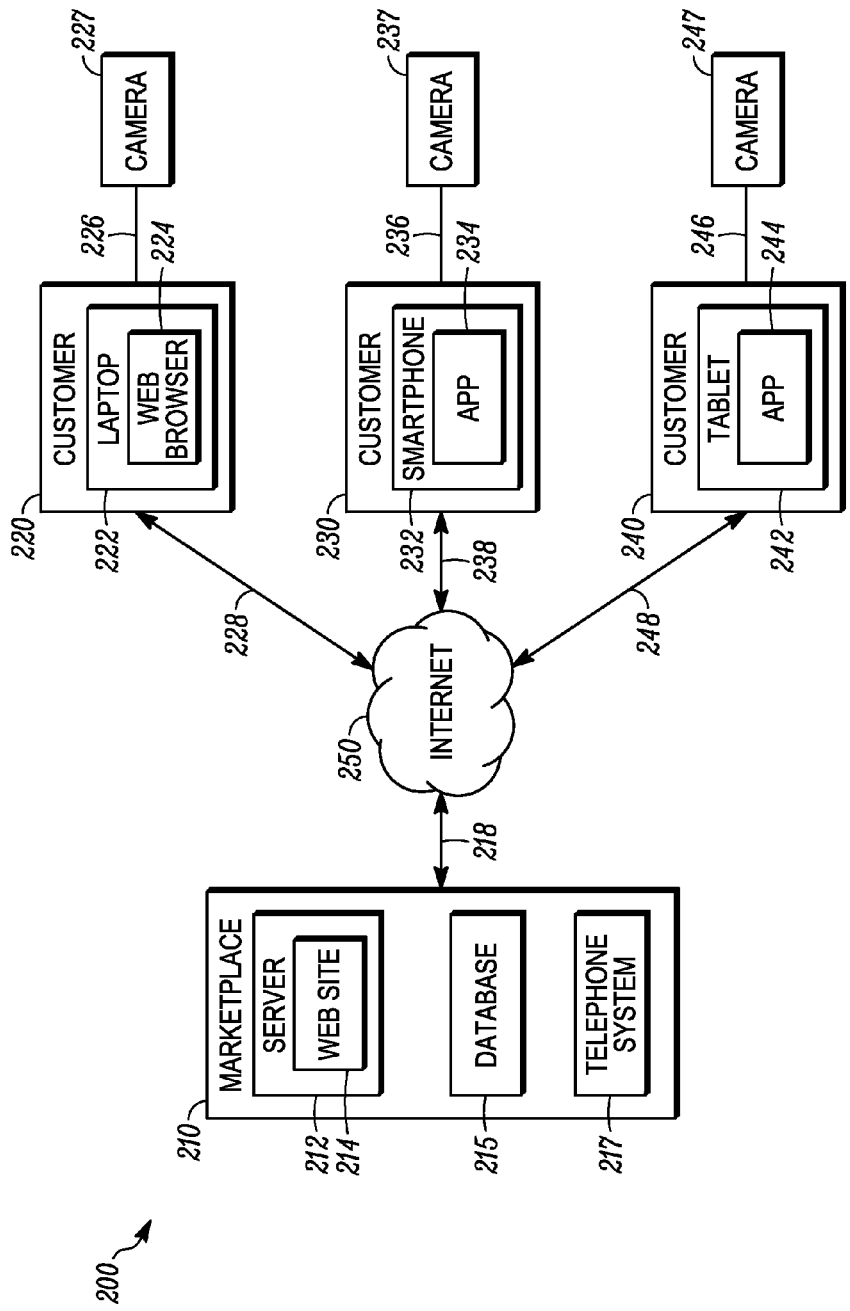
FIG. 2 is a block diagram of the components of a system utilizing one or more sign language computer interfaces, in accordance with embodiments of the present disclosure.

Referring to FIG. 2, the various components of an embodiment of an interactive system 200 that may be utilized in accordance with the systems and methods of the present disclosure are shown. The system 200 includes an electronic commerce or Internet-based marketplace (or supplier, retailer, seller, reseller or distributor) 210 and a plurality of customers 220, 230, 240 (or users, consumers, clients, shoppers or buyers) that are connected to a communications network 250, such as the Internet. The marketplace 210 may be an entity that sells items or otherwise makes items available for download, rent, lease, borrowing by customers 220, 230, 240 through a web site 214 which is implemented using one or more physical computer servers 212. The marketplace server 212 and/or web site 214 may be connected to or otherwise communicate with the computers operated by the customers 220, 230, 240, such as a laptop computer 222, a smartphone 232 or a tablet computer 242, through the communications network 250, as indicated by lines 228, 238, 248, by sending and receiving digital data over the network 250. Additionally, one or more of the items made available at the marketplace 210 may be made by or obtained from one or more third party vendors (or merchants or manufacturers), which are not shown in FIG. 2, and the marketplace 210 itself may be a vendor, merchant or manufacturer.

The marketplace 210 may include or access a database (or data store) 215 for storing various data regarding the items that are available at the online marketplace 210 and/or the customers 220, 230, 240, such as customer profiles (i.e., a customer's address, billing and shipping information, and purchasing history), as well as one or more libraries, dictionaries or other resources for interpreting or translating captured motions, gestures and/or mannerisms into one or more sign languages. The marketplace 210 may also include or access a telephone system 217 for communicating with vendors, suppliers, manufacturers or the customers 220, 230, 240 by telephonic means.

The customers 220, 230, 240 can be any entities or individuals that wish to purchase, download, rent, lease, borrow, or otherwise obtain items (which may include, but are not limited to, goods, products, services, information or media of any type or form) from the marketplace 210 using one or more computers and/or applications operating thereon. For example, the customer 220 may access the marketplace web site 214 using a web browser 224 running on a laptop computer 222, while the customer 230 may access the marketplace web site 214 using one or more applications 234 operating on a smartphone 232, and the customer 240 may access the marketplace web site 214 using one or more applications 244 operating on a tablet computer 242. The computers operated by customers 220, 230, 240, including the laptop computer 222, the smartphone 232 and the tablet 242 computer 242, may be connected to or otherwise communicate with the marketplace server 212 through the communications network 250, as indicated by lines 228, 238, 248, by sending and receiving of digital data over the network 250. The web browser 224 and applications 234, 244 may also provide one or more user interfaces for the customers 220, 230, 240 to view and/or communicate with the marketplace web site 214.

As is shown in FIG. 2, the laptop computer 222, the smartphone 232 and the tablet computer 242 may include one or more cameras 227, 237, 247, which may be connected to or otherwise associated with the computers 222, 232, 242, as indicated by lines 226, 236, 246. The cameras 227, 237, 247 may be built-in cameras or those that are connected to the computers 222, 232, 242 by one or more external wires or wireless means (e.g., USB, WiFi or Bluetooth). The cameras 227, 237, 247 may include their own operating systems or may be operated in connection with one or more of the computers 222, 232, 242 and/or applications operating thereon, such as through the use of drivers or other operating software.

Also, those of skill in the pertinent art will recognize that the customers 220, 230, 240 may use a keyboard, keypad, mouse, stylus, touch screen, or other device (not shown) or method for interacting with their respective computers 222, 232, 242 and/or applications or web browsers 224, 234, 244, or to "select" an item, link, node, hub or any other aspect of the present disclosure.

The computers, servers, and the like described herein have the necessary electronics, software, memory, storage, databases, firmware, logic/state machines, microprocessors, communication links, displays or other visual or audio user interfaces, printing devices, and any other input/output interfaces to perform the functions described herein and/or achieve the results described herein.

Except where otherwise explicitly or implicitly indicated herein, the term "marketplace," or like terms, may refer to any entity or individual that sells or otherwise makes items available for purchase, download, rent, lease or borrowing at a web site that is implemented using one or more computer systems, as well as the associated computer systems operated or controlled by a marketplace. Except where otherwise explicitly or implicitly indicated herein, the terms "user," "customer" or "consumer," or like terms, may refer to any entity or individual that wishes to purchase, download, rent, lease, borrow, or otherwise obtain items from a marketplace, as well as the associated computer systems operated or controlled by a user, customer or consumer, respectively.

Thus, process steps described as being performed by a "marketplace," a "user," a "customer" or a "consumer" may be automated steps performed by their respective computer systems, or implemented within software modules (or computer programs) executed by one or more general purpose computers. For example, the web browser (or user interface) 224 or the applications 234, 244 may be implemented on the laptop computer 222, the smartphone 232 or the tablet computer 242 using one or more software modules or computer programs. Specially designed hardware could, alternatively, be used to perform certain operations. Moreover, process steps described as being performed by a "marketplace," a "user," a "customer" or a "consumer" are typically performed by a human operator via the computers 222, 232, 242, but could, alternatively, be performed by an automated agent.

The customers 220, 230, 240 may use any web-enabled or Internet applications, such as the web browser 224 or applications 234, 244, or any other client-server applications or features including electronic mail (or E-mail), or other messaging techniques to communicate with (or connect to) the marketplace web site 214 and/or server 212 through the communications network 250, such as short or multimedia messaging service (SMS or MMS) text messages. In addition, while the customers 220, 230, 240 are shown in FIG. 1 as utilizing a laptop computer 222, a smartphone 232 and a tablet computer 242, respectively, customers may utilize any of a number of other computing devices that are capable of communicating over the network, including but not limited to set-top boxes, personal digital assistants, mobile phones including "smart" phones, digital media players, web pads, desktop computers, electronic book readers, televisions, video game consoles, appliances and the like. The protocols and components for providing communication between the customer computers 222, 232, 242 and/or web browser 224 or applications 234, 244 or the marketplace server 212 and/or web site 214 are well known to those skilled in the art of computer communications and thus, need not be described in more detail herein.

The data and/or computer executable instructions, programs, firmware, software and the like (also referred to herein as "computer executable" components) described herein may be stored on a computer-readable medium that is within or accessible by the customer computers 222, 232, 242 and/or the marketplace server 212, and having sequences of instructions which, when executed by a processor (such as a central processing unit, or CPU), cause the processor to perform all or a portion of the functions and/or methods described herein. Such computer executable instructions, programs, software and the like may be loaded into the memory of the customer computers 222, 232, 242, and/or the marketplace server 212 using a drive mechanism associated with the computer readable medium, such as a floppy drive, CD-ROM drive, DVD-ROM drive, network interface, or the like, or via external connections. For example, the systems and methods of the present disclosure may be incorporated into existing software for operating peripherals (e.g., drivers) or in free-standing applications, or may be included as plug-ins that provide additional functionality to existing software applications (e.g., browsers, word processing applications, and the like). Furthermore, the systems and methods of the present disclosure may be incorporated into existing web sites and/or servers at remote locations, such as an online marketplace, and may receive video signals from local users, such as customers, over a communications network such as the Internet.

The systems and methods of the present invention are generally directed to communicating by and through computer-based systems through the use of motions, gestures and/or mannerisms, such as those motions, gestures and/or mannerisms that are compliant or consistent with one or more recognized sign languages. In a currently preferred embodiment, an online marketplace or other electronic commerce ("e-commerce") environment that includes or practices one or more such systems and methods may receive, in response to a query, a communication containing one or more sensed or captured human motions, gestures and/or mannerisms in video form, such as a media or data file containing or indicative of one or more human gestures or mannerisms. The systems and methods may thus convert or otherwise translate the human motions, gestures and/or mannerisms into a response to the query, and may act upon the response as if it were provided by conventional written or oral means (e.g., typed or spoken words). Moreover, the online marketplace may respond in kind to the customer, such as by presenting text-based messages, or video representations of motions, gestures and/or mannerisms in accordance with one or more recognized sign languages, to the customer for display on a computer display. For example, where an online marketplace wishes to express a message of gratitude, such as the words "thank you," to a customer who is hearing impaired, the online marketplace may either cause a display of the words "thank you" on the customer's screen, or display a video representation of a person who forms a "flat hand," places the tips of his or her index, middle and ring fingers of the flat hand on his or her mouth and moves the flat hand forward and downward toward the camera while smiling, a gesture that is recognized as corresponding to the words "THANK YOU."

The systems and methods of the present disclosure may further incorporate various components and/or techniques for estimating or predicting one or more appropriate phrases based on one or more captured or senses motions, gestures and/or mannerisms. For example, the systems and methods of the present disclosure may utilize one or more databases or data stores containing libraries, dictionaries or other resources of various motions, gestures and/or mannerisms along with associated words or phrases, and may further utilize one or more confidence level formulas or algorithms to determine which of the words or phrases within the libraries, dictionaries or other resources is a pertinent match to the motions, gestures and/or mannerisms identified therein. The systems and methods of the present disclosure may further utilize one or more computer-related predictive tools, such as machine learning tools, to determine which of the words or phrases is a pertinent match.

Additionally, according to some embodiments of the present invention, the libraries, dictionaries or other resources used to associate captured or sensed motions, gestures and/or mannerisms with phrases may be narrowed or selected based on the context of the communication. For example, an appropriate or customized library or dictionary may be selected based on the identity of a speaker (i.e., based on the language or phraseology that he or she is known to utilize) or a reason for the communication (i.e., one subset of sign language may be appropriate for a communication for ordering an item while another subset of the same sign language may be appropriate for contacting customer service). An appropriate or customized library or dictionary may also be selected based on a speaker's known dialect (i.e., variety of a language that is distinguished from other varieties of the same language by features of phonology, grammar, and vocabulary, or by its use by a group of speakers who are set off from others geographically or socially) or idiolect (i.e., a person's individual speech pattern). More particularly, when the systems and methods of the present disclosure are utilized in an electronic commerce application, an appropriate or customized library or dictionary may be based on a speaker's known commercial history and behavior, such as items previously purchased or considered by the speaker, or categories of items or items that are related to items previously purchased or considered by the speaker.

Figure 3:
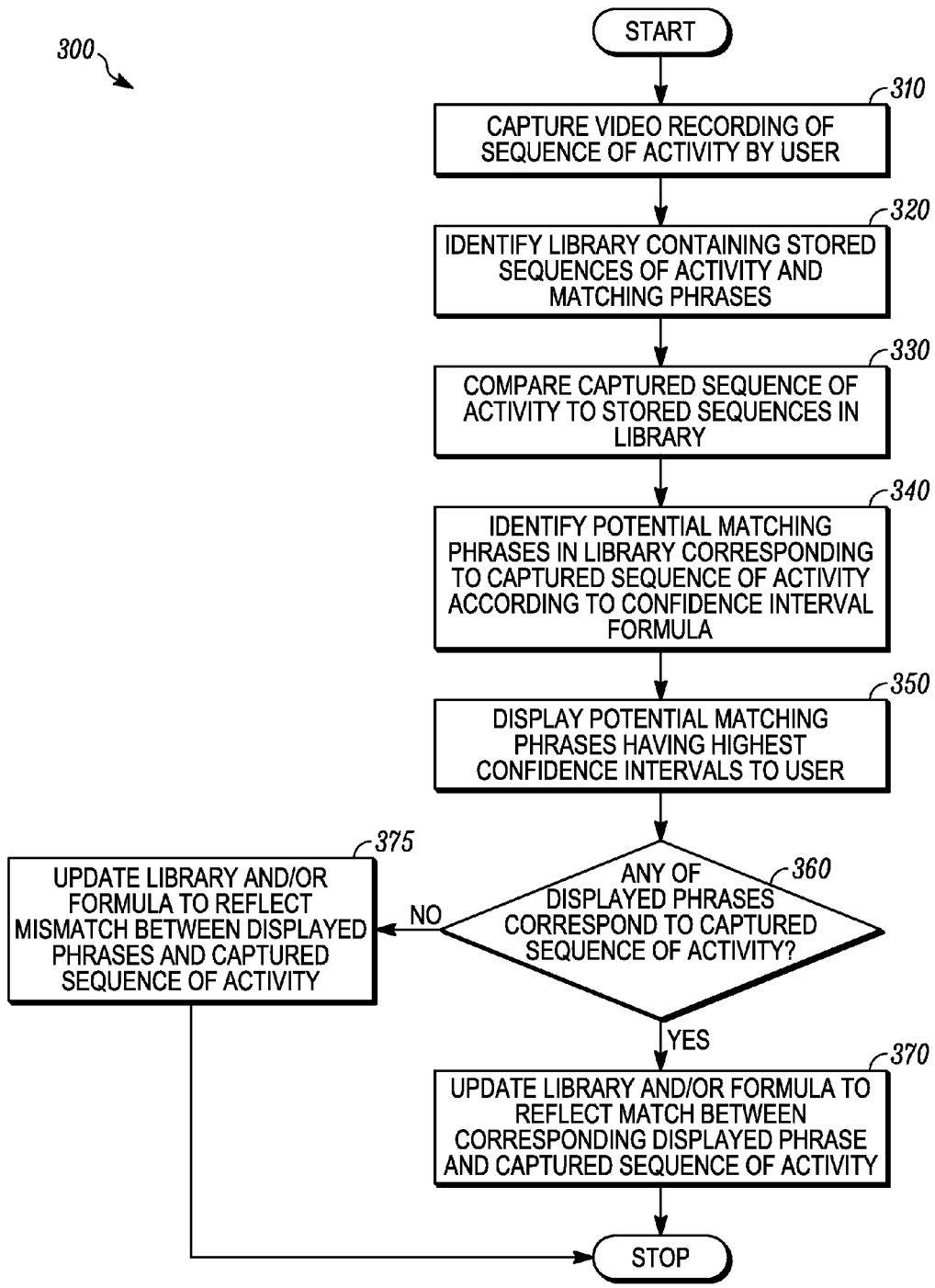
FIG. 3 is a flow chart of a method for communicating by way of a sign language computer interface, in accordance with embodiments of the present disclosure.

Referring to FIG. 3, a flow chart 300 representing one embodiment of a method for communicating by way of one or more sign language computer interfaces is shown. At step 310, a video recording of a sequence of activity performed by a user is captured. For example, a built-in or peripheral camera associated with one or more computing device, such as the cameras 227, 237, 247 of the laptop computer 222, the smartphone 232 or the tablet computer 242 of FIG. 2, may record a user performing one or more gestures and/or mannerisms in accordance with a recognized sign language. At step 320, a library containing stored sequences of activity and matching phrases may be identified. For example, where a user performs gestures and/or mannerisms in a particular sign language, such as the American Sign Language, a database or data store containing phrases associated with gestures and/or mannerisms performed in accordance with the American Sign Language may be identified.

At step 330, the captured sequence of activity may be compared to one or more of the stored sequences in the library. For example, where the video recording is determined to include one or more motions, the features of such motions may be compared to those stored in the library. At step 340, potentially matching phrases in the library that correspond to the captured sequence of activity may be identified according to a confidence interval formula. For example, where a sensed motion includes a curling of the index finger of the dominant hand, a placement of the curled index finger in front of the lips, and a movement of the dominant hand and extension of the curled index finger, some potentially matching phrases that may be identified as corresponding to the sensed motions include the words "SPIT" and "TATTLE," two words which are signed, in part, by performing the same or similar features.

At step 350, the potential matching phrases having the highest confidence intervals may be displayed to the user. At step 360, the user may be prompted to confirm whether any of the displayed phrases corresponds to the sequence of activity that he or she performed. For example, where the two words having the highest confidence intervals are "SPIT" and "TATTLE," pop-up boxes or like interfaces including the phrases, "Did you mean SPIT?" or "Did you mean TATTLE?" may be presented to the user.

If the user indicates that one or more of the displayed phrases corresponds to the captured sequence of activity, then at step 370, the library and/or the confidence level formula is updated to reflect which of the phrases have been confirmed to correspond to the captured sequence of activity. If the user indicates that none of the displayed phrases corresponds to the captured sequence of activity, then at step 375, the library and/or formula may be updated to reflect the mismatch between the displayed phrases and the captured sequence.

Accordingly, the systems and methods of the present disclosure, such as the method represented by flow chart 300 of FIG. 3, may be utilized to analyze a video recording of a captured sequence of activity by a user, such as gestures and/or mannerisms performed in accordance with one or more sign languages, and to analyze the captured sequence of activity to identify one or more phrases associated therewith, based on one or more mathematical or logical algorithms, such as a confidence level formula. One or more potentially matching phrases may be displayed to the user, who may confirm whether any of the phrases corresponds or is otherwise consistent with his or her intended communication in performing the sequence of activity. The algorithms may be updated to reflect whether the suggested phrase accurately reflects the communication that was intended by the user, or whether changes to the predictive and/or analytical processes which suggested the potentially matching phrase are ultimately required.

A confidence interval generally understood to indicate the reliability of estimates. A confidence interval providing an estimate in the form of an interval of numbers, along with a measure of the confidence one has that an interval will, in fact, contain a true value of the parameter or characteristic being estimated. For multiple parameters, a separate confidence interval may be calculated for each parameter, or a multi-dimensional confidence region or array may be defined for the set of parameters. For single parameters, a confidence interval $X_1, \ldots, X_n$ for a sample size n and a parameter $\theta$ is a defined by two limits, wherein the lower limit $L_1$ and the upper limit $L_2$ may be expressed according to Equation (1), below:

$$P(L_1(X_1, \ldots ,X_n) < \theta < (L_2(X_1, \ldots ,X_n)) \approx \gamma \quad (1)$$

Confidence intervals, including those calculated according to equations such as Equation (1), are usually expressed in percents, i.e., if $\gamma=0.90$, the interval is deemed a 90% confidence interval.

Therefore, in accordance with the systems and methods of the present disclosure, a confidence interval representing the likelihood that a captured sequence of activity corresponds to a particular word or phrase, i.e., falls within the interval, may be calculated and the one or more of the particular words or phrases having the highest confidence intervals may be displayed to a user.

As is set forth above, gestures and/or mannerisms may be captured through one or more standard video recording means, such as cameras. For example, a single camera may be used to record a two-dimensional sequence of activity. Alternatively, multiple cameras may be used, such as to record gestures and/or mannerisms from multiple angles, in order to provide multiple views of a sequence of activity. In such a manner, a stereoscopic impression of three-dimensional motion may be generated and further analyzed by the systems and methods of the present disclosure with greater precision and clarity than a captured two-dimensional sequence of activity.

Figure 4A:
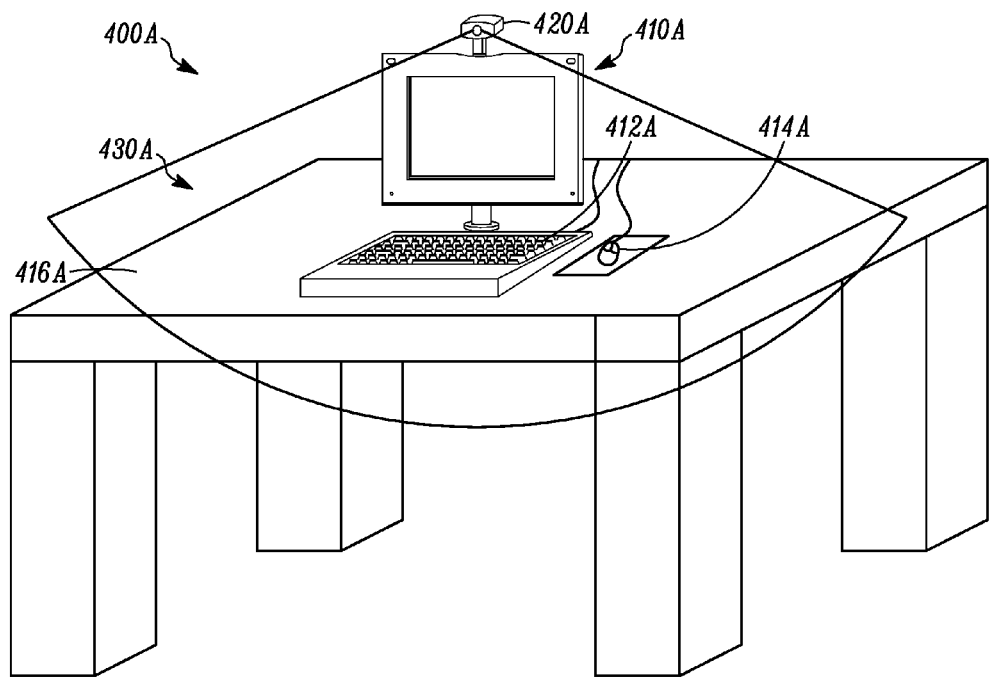
FIGS. 4A and 4B are perspective views of a system for communicating by way of a sign language computer interface, in accordance with embodiments of the present disclosure.
Figure 4B:
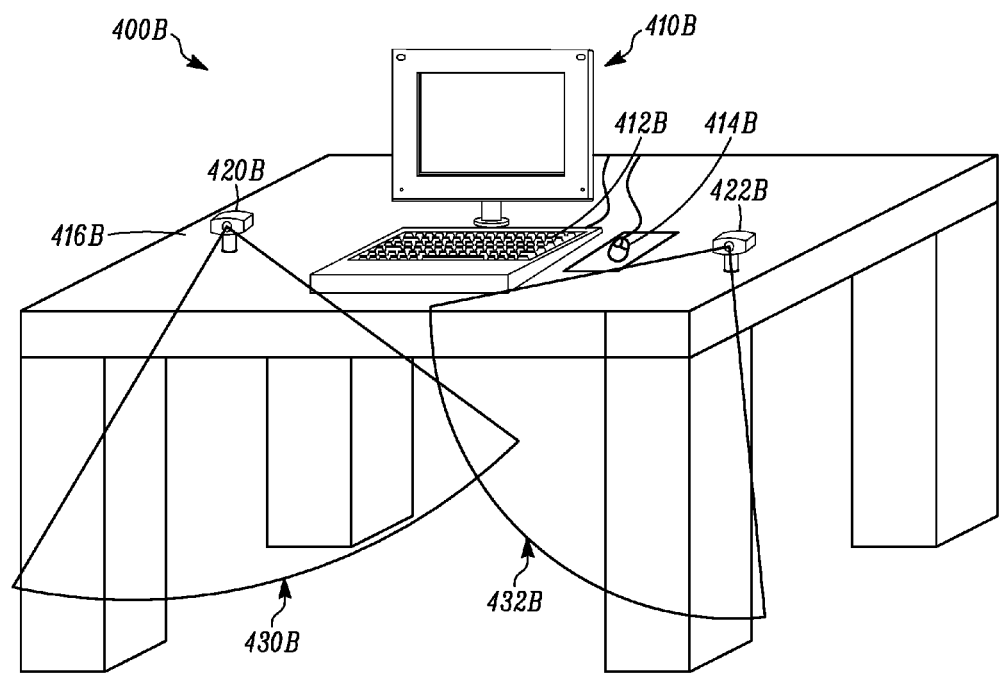

Referring to FIG. 4A, a computer system 400A including a computer 410A having a keyboard 412A and pointing peripheral 414A, such as a mouse, on a desk 416A is shown. The computer system 400A includes a single camera 420A mounted atop a monitor, and the camera 420A provides a single field of view 430A of activity that may be performed by a user of the computer system 400A. Referring to FIG. 4B, a computer system 400B is shown. The computer system 400B is similar to the computer system 400A of FIG. 4A, but includes two cameras 420B, 422B which may record two fields of view 430B, 432B of any activity that may be performed by a user. In such a manner, the computer system 400B of FIG. 4B is better able to capture a more complete view of any gestures and/or mannerisms that may be performed by a user of the system. Although the computer system 400A of FIG. 4A includes one camera 420A, and the computer system 400B of FIG. 4B includes two cameras 420B, 422B, the systems and methods of the present disclosure are not limited to the use of one or two cameras, and any number of cameras aligned at any number of angles may be utilized in accordance with the systems and methods of the present disclosure.

As is set forth above, the systems and methods of the present disclosure may enable users to communicate with computer-based systems and methods by identifying motions, gestures and/or mannerisms by such users within video imagery, and by identifying phrases associated with the identified motions, gestures and/or mannerisms that may be stored in one more libraries, dictionaries or other resources, consistent with at least one recognized sign language.

As with oral languages, those of ordinary skill in the art recognize that there are many words or phrases in sign language that are homonyms, in that the signed motions, gestures and/or mannerisms for forming the words are similar to one another. For example, in the American Sign Language, the word "CONTACT" is similar to the word "INTERNET," in that each word is formed by forming a "flat hand," holding the hands in front of the torso with the palms of the hands facing one another, shoulder-width apart, and extending the middle finger of each hand toward one another. While the word "CONTACT" is formed by bringing the hands together in front of the torso such that the middle fingers of each hand touch one another, the word "INTERNET" is formed by moving the hands forward and back several times in front of the torso, such that the middle fingers graze one another during the forward-and-back motion. The proper determination of the meaning intended by a gesture and/or mannerism performed in accordance with most sign languages may be heavily dependent upon the context of the conversation. For example, where a motion is captured on video and is determined to include the user forming a pair of flat hands, bringing the flat hands in front of the user, extending the middle fingers toward one another and bringing the middle fingers in contact with one another, the captured motion is likely to be understood as referring to the "INTERNET" if the context of the communication involves computers, and to understood "CONTACT" if the context of the communication includes contact information (e.g., mailing addresses or electronic-mail addresses).

Accordingly, the accuracy of the systems and methods of the present disclosure may be enhanced by determining a context associated with a communication, and by identifying a particular library, or narrowing a general library, based on the context of the communication. For example, where a user forms the letter "B" with one hand (i.e., by opening one hand and extending the four fingers in parallel within a plane of the palm of the hand, and by curling the thumb to within the palm and perpendicular to the fingers), and, with the palm of the hand facing forward, rubs the inside of the index finger of that hand vertically down one side of his or her face, such a gesture is similar to the words "BEER" and "BROWN." Where the context of the communication is related to entertainment or refreshments, the gesture may be understood to mean "BEER." Where the context of the conversation is related to a color, the gesture may be understood to mean "BROWN."

The context of a communication may be defined by any relevant factor, including an identity of the communicator (which may aid in determining a particular idiolect of the communicator), a location from which the communication originated (which may be specified by the communicator or sensed through the use of standard means, such as Global Positioning System (GPS) or cellular triangulation), the communicator's previous relevant behavior, or the reason for the communication. For example, where an online marketplace requests that a user provide an indication as to a size, such as of an article of clothing, a particular library limited to gestures and phrases relating to sizes (e.g., gestures for expressing the words "SMALL," "MEDIUM," "LARGE" or "EXTRA LARGE") may be identified. Where an online marketplace requests that a user provide his or her name, a particular library consisting primarily of gestures for forming letters may be identified, as proper names are typically formed by "fingerspelling," or by performing the gestures for each of the letters in the proper name. Where a user has previously visited an online marketplace to purchase, view or consider an item or a category of items, a particular library focused on items that have been previously purchased, viewed or considered by the user, or items related to those that have been previously purchased, viewed or considered by the user, may be identified. Any particular library may be identified based on any context associated with a communication, and for any reason.

Figure 5:
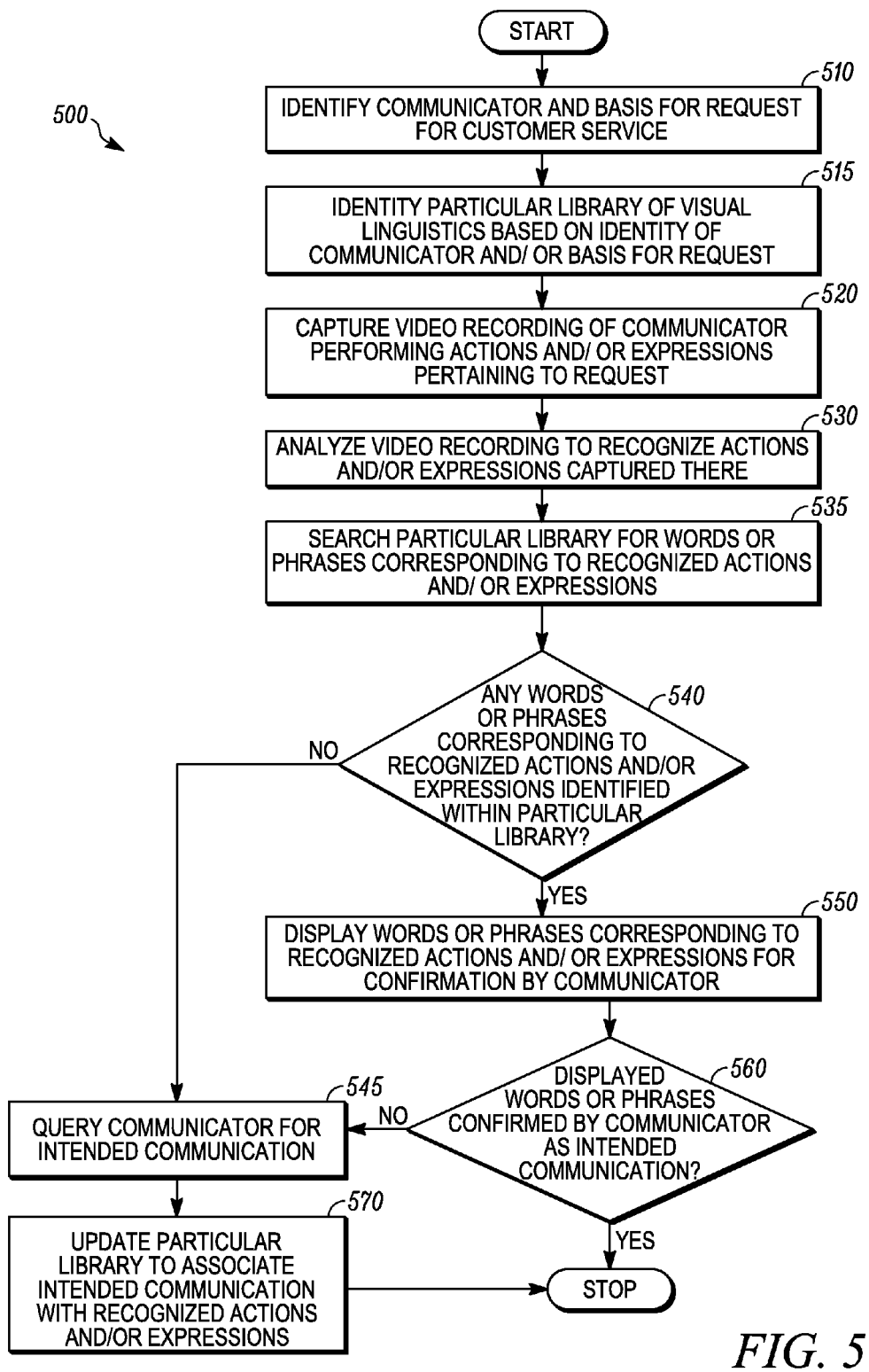
FIG. 5 is a flow chart of a method for communicating by way of a sign language computer interface, in accordance with embodiments of the present disclosure.

As is set forth above, the systems and methods of the present disclosure may be utilized to provide customer service to those who communicate in sign language, such as the hearing impaired, through one or more computer-based systems. Referring to FIG. 5, a flow chart 500 representing one embodiment of a method for communicating by way of a sign language computer interface is shown. Except where otherwise noted, reference numerals preceded by the number "5" in FIG. 5 indicate steps that are similar to steps having reference numerals preceded by the number "3" shown in FIG. 3.

At step 510, a communicator who is requesting customer service, and the basis for his or her request, are identified. At step 515, a particular library of visual linguistics may be identified based on either the identity of the communicator and/or the basis for his or her request. For example, a library may be identified based on a language (e.g., American Sign Language, British Sign Language), dialect or idiolect that the communicator is known to utilize, or a reason for the request for customer service (e.g., a recent purchase or previous request for service).

At step 520, a video recording of actions and expressions performed by the communicator pertaining to the request is captured. At step 530, the video recording may be analyzed to recognize actions and/or expressions captured within the video recording. At step 535, the particular library may be searched for words or phrases corresponding to the actions and/or expressions recognized within the video recording.

For example, where the video recording includes a series of gestures expressed in accordance with one or more sign languages, the video recording may be processed in order to recognize the gestures, and the library may be searched to identify words or phrases corresponding to the recognized gestures within the video recording.

At step 540, it is determined whether any words or phrases corresponding to the recognized actions and/or expressions have been identified within the video recording. If any such words or phrases have been identified, then at step 550, such words or phrases are displayed for confirmation by the communicator. At step 560, if the displayed words or phrases are confirmed by the communicator to correspond to the intended communication, then the process ends.

If no such words or phrases are identified within the video recording at step 540, or if the communicator indicates that none of the displayed words or phrases corresponds to the communicator's intended communication at step 560, then at step 545, the communicator is queried to provide the communication that he or she intended when performing the actions and/or expressions captured within the video recording, i.e., by typing the communication into a text box or other interface. At step 570, the particular library is updated to associate the intended communication with the actions and/or expressions recognized within the video recording at step 530, and the process ends.

Accordingly, the systems and methods of the present disclosure may determine a context relating to a communicator and/or a message (e.g., a video clip or recording), identify one or more motions, gestures and/or mannerisms expressed within the message, determine an appropriate library, dictionary or other resource for interpreting the message based on the context, and search the library, dictionary or resource to identify words or phrases corresponding to the motions, gestures and/or mannerisms identified within the message, according to one or more computer-based, mathematical or logical means (e.g., a machine learning tool or algorithm). If words or phrases corresponding to the motions, gestures and/or mannerisms identified within the message are found within the library, dictionary or resource, the communicator may be asked to confirm that the words or phrases correspond to what he or she intended to say in the communication. If words or phrases are not identified within the library, dictionary or other resource, or if the identified words or phrases do not correspond to the communicator's intended communication, then the means for identifying the words or phrases corresponding to the motions, gestures and/or mannerisms within the message may be updated or revised accordingly.

Figure 6B:
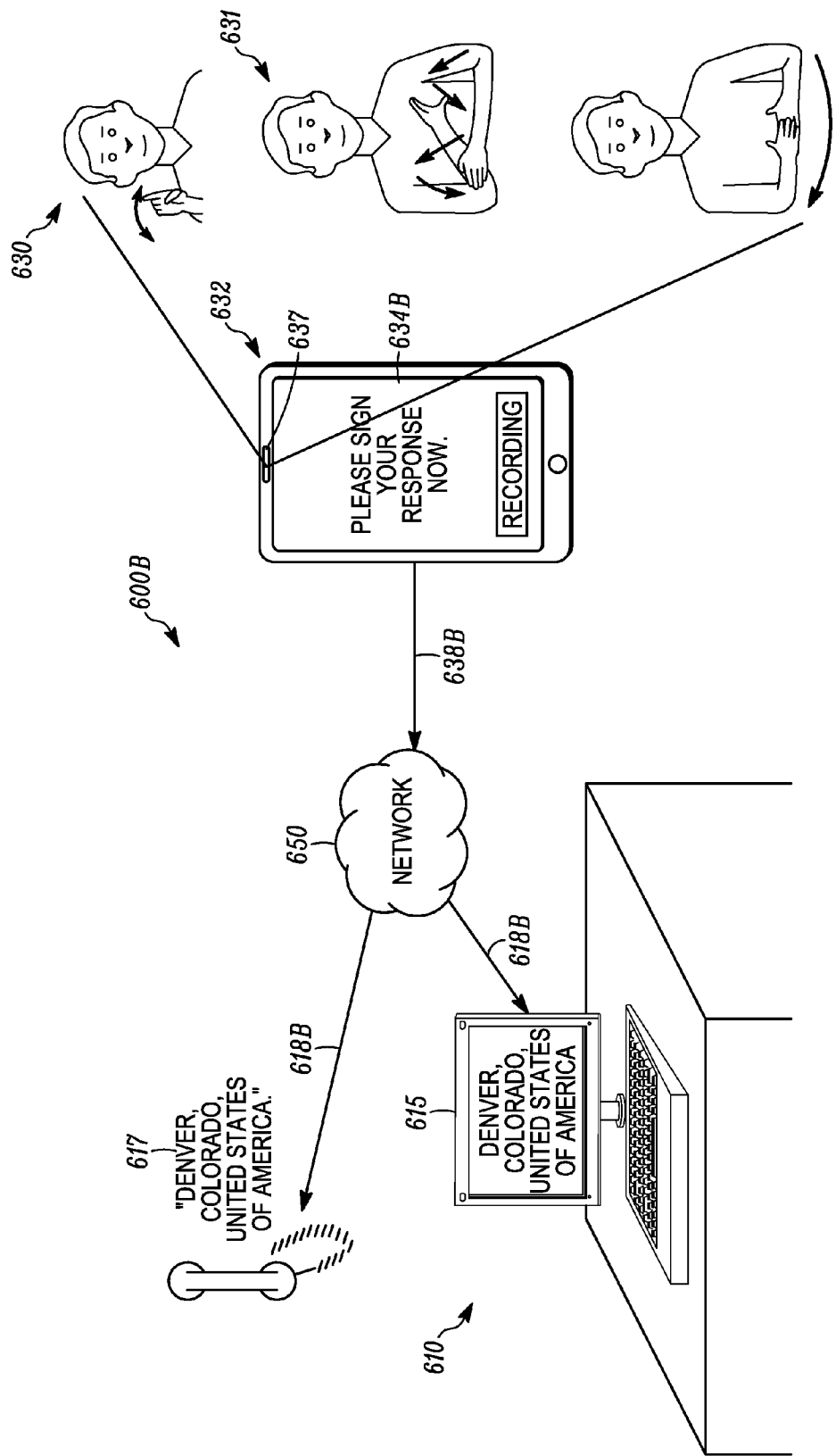

Referring to FIG. 6A, a flow diagram 600A for communication by way of sign language computer interfaces is shown. Except where otherwise noted, reference numerals preceded by the number "6" in FIG. 6A and in FIG. 6B indicate components or features that are similar to components or features having reference numerals preceded by the number "2" shown in FIG. 2.

The flow diagram 600A displays a communication between a call center 610 and a customer 630 through a communications network 650. The call center 610 includes a computer 615A and a telephone system 617A. The customer 630 operates a smartphone 632 that is equipped with a camera 637.

As is shown in FIG. 6A, the call center 610 transmits a request 618A, such as "hello, where are you?" to the customer 630, beginning at the computer 615 and/or the telephone system 617. The request 618A is transmitted from the computer 615 or telephone system 617 to the network 650, and is then subsequently transmitted to the smartphone 632, where the request is converted to sign language and displayed on an interface 634A on the smartphone 632. As is shown in FIG. 6A, the interface 634A includes the request 638A expressed by the words, "hello, where are you?" and also a video representation of a gesture corresponding to the request 638A as received from the network 650.

In accordance with the systems and methods of the present disclosure, the customer 630 may also provide a response 638B to the request 618A from the call center 610 in sign language. Referring to the flow diagram 600B shown in FIG. 6B, the smartphone 632 displays an instruction on an interface 634B, and the customer 630 performs a series of gestures and/or mannerisms indicating that he is located in Denver, Colo., within the field of view of camera 637 of the smartphone 632. The smartphone 632 then transmits the response 638B to the network 650 and, subsequently, to the call center, 610, where the response 618B is converted to text and displayed on a screen of the computer 615, and/or where the response 618B is converted to audio and played aloud for one or more operators of the telephone system 617.

Accordingly, as is shown in the flow diagrams 600A, 600B of FIGS. 6A and 6B, the systems and methods of the present disclosure enable users to communicate between or with computer-based systems through the use of one or more recognized sign languages, and may not only receive messages expressed in sign language and convert such messages to traditional computer-based messages, but also translate traditional-computer based messages (e.g., messages including text or audio signals) into video expressions of sign language.

As is discussed above, the systems and methods of the present disclosure may be utilized to convert one or more messages from sign language into information or instructions that may be identified by one or more computer-based systems, using at least one library, dictionary or other resource that may be selected based on a context of the message. For example, where a customer attempts to purchase an item from an online marketplace, a library, dictionary or other resource may be selected based on the identity of the customer, the category of items, or the desired item itself.

Figure 7:
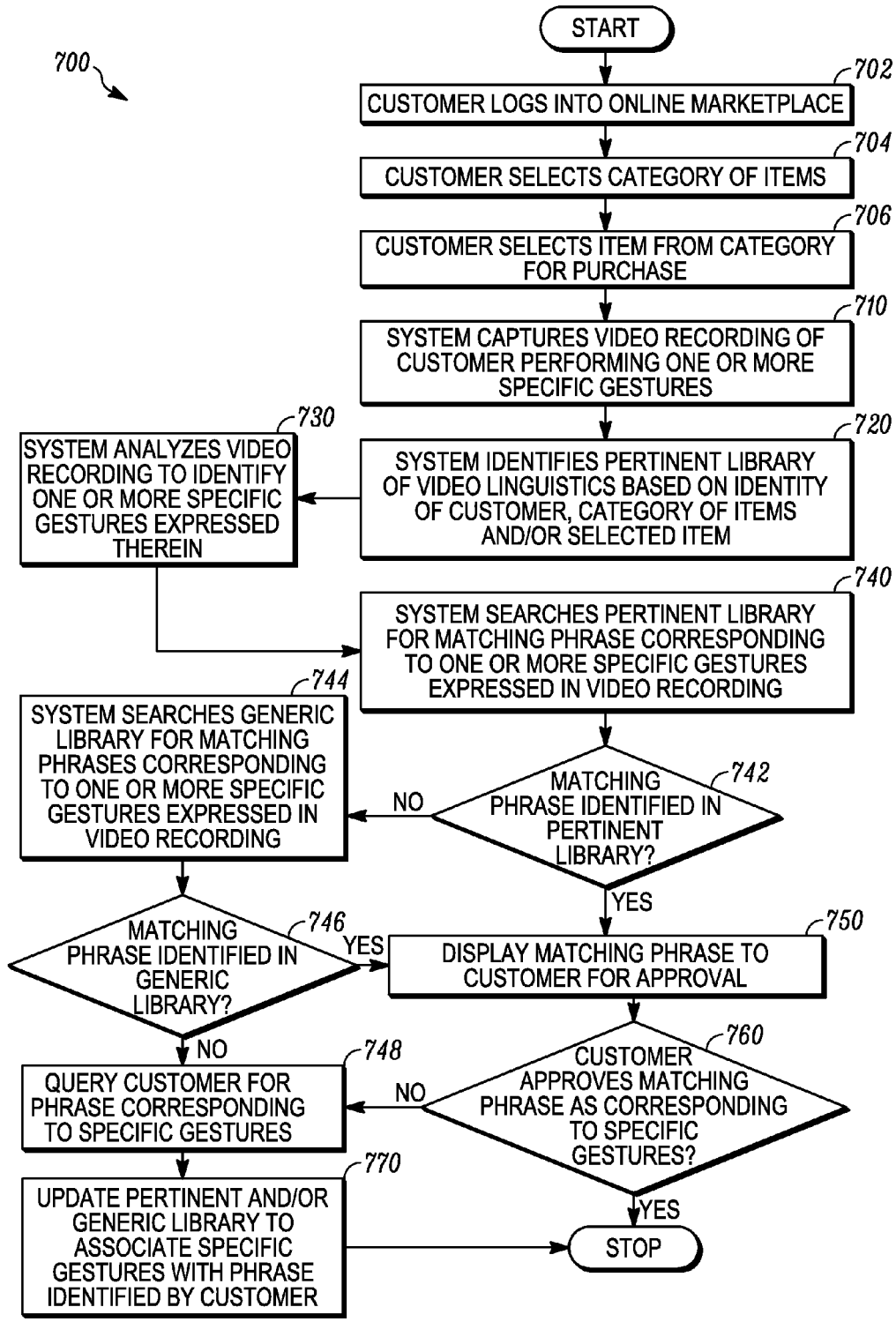
FIG. 7 is a flow chart of a method for communicating by way of a sign language computer interface, in accordance with embodiments of the present disclosure.

Referring to FIG. 7, a flow chart 700 is shown. Except where otherwise noted, reference numerals preceded by the number "7" in FIG. 7 indicate components or features that are similar to components or features having reference numerals preceded by the number "5" shown in FIG. 5 or the number "3" shown in FIG. 3.

At step 702, a customer logs into an online marketplace and, at steps 704 and 706, selects a category of items and an item for purchase from the category. For example, where a customer intends to purchase a spare carburetor for his jeep, the customer may visit an Internet site maintained by an auto parts warehouse and select "combustion engine" as the category of items and "carburetor" as the item for purchase. At step 710, the system captures a video recording of the customer performing one or more specific gestures. For example, where the customer attempts to identify a "JEEP" as the type of automobile for which he or she would like to purchase a carburetor, the customer may form the letter J with each of his hands in front of his torso, make an outward twisting motion with his hands, change his hands to the letter P while twisting them outwardly, and bring the hands together in front of his torso. At step 720, the system identifies a pertinent library based on at least one of the customer's identity, the category of items, and/or the selected item. For example, because the customer has selected "combustion engine" as a category and "carburetor" as an item, the system may search for and identify libraries containing gestures and phrases associated with engineering or automobile terminology. Alternatively, where the customer has previously purchased replacement parts of a particular type of automobile, the system may search for and identify libraries containing gestures and phrases associated with the particular type of automobile for which the customer previously purchased replacement parts.

At step 730, the system analyzes the video recording to identify one or more specific gestures expressed therein. At step 740, the system searches the pertinent library for one or more matching phrases corresponding to the one or more specific gestures expressed in the video recording. For example, the system may search a library of engineering or automobile-related terms to identify words or phrases corresponding to the customer's formation of the letter J with each of his hands, the outward twisting motion of each of his hands, and the formation of the letter P with each of his hands.

At step 742, if a matching phrase is identified in the pertinent library, then at step 750, the matching phrase will be displayed to the customer for his approval. For example, the Internet site may display the words, "Did you mean 'Jeep'?" to the customer. If the customer approves the matching phrase as corresponding to his specific gestures at step 760, then the process ends. If the customer does not approve the matching phrase as corresponding to his specific gestures, then the process advances to step 748, where the customer is queried for a phrase corresponding to the specific gestures, and at step 770, the pertinent library is updated to associate the specific gestures with the phrase identified by the customer.

If no matching phrase is identified in the pertinent library at step 742, then the system advances to step 744, where the system searches a generic library for matching phrases corresponding to the one or more specific gestures expressed in the video recording. For example, whereas an engineering or automotive sign language library was identified at step 720, a broader, more general library containing terms pertaining to a variety of sources may be searched for matching phrases corresponding to the specific gestures, in view of the inability to identify such a matching phrase at step 742. If a matching phrase is identified in the generic library, then the system advances to step 750 and displays the matching phrase to the customer for his or her approval. If no matching phrase is identified in the generic library, then the system advances to step 748 to query the customer for such a phrase, and to step 770, where the pertinent and/or generic libraries are updated to associate the specific gestures with the phrase identified by the customer. For example, where the library lacks the word "Jeep," the customer may be asked to respond to the question, "What did you mean by your gesture?" and may enter the word "Jeep," which will be associated with future instances in which the same or a similar gesture is identified by the system.

Accordingly, the systems and methods of the present disclosure, such as the embodiment of the method shown in flow chart 700 of FIG. 7, may be utilized to receive information from a customer regarding one or more items for purchase, to capture or sense a video recording containing one or more motions, gestures and/or mannerisms performed by the customer, and to search a pertinent library for words or phrases corresponding to the motions, gestures and/or mannerisms based on a context of the communication. If such words or phrases are identified in the pertinent library, then the customer may be prompted to indicate his or her approval of any words or phrases that are suggested as applicable to the customer's motions, gestures and/or mannerisms. If no such words or phrases are identified, the system may search a broader, more general library for corresponding words or phrases, or may query the customer for words or phrases that he or she intended in performing the gestures, motions and/or mannerisms. Therefore, the accuracy of systems and methods of the present disclosure may be further refined at a specific level by narrowing the focus of the libraries to be searched based on a context of the communication, and also at a general level, by requesting that the customer approve any words or phrases identified in the pertinent or generic library as corresponding to a specific gesture, and querying the customer for his or her intended words or phrases if none are identified, or if the identified words or phrases do not correspond to the customer's intent in performing the specific gesture.

Although the disclosure has been described herein using exemplary techniques, components, and/or processes for implementing the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure. While the present disclosure describes exemplary embodiments that may be associated with online marketplaces, or utilized by the hearing impaired, the systems and methods of the present disclosure are not so limited, and may be utilized in connection with any computer-based systems to enable users to communicate with such systems without the use of a keyboard or other communication device, such as a mouse.

For example, one embodiment of the systems and methods of the present disclosure may be utilized in connection with a video system for monitoring a sleeping child who is unable to speak, but is trained to perform one or more sign language gestures. Where the child awakes from a nap and has a particular need (i.e., for a drink, for a new diaper or for a parent's attention), the child may perform one or more sign language gestures according to his or her particular need. The gestures may be sensed and interpreted by the video system, and an audible or text-based message, such as "Gavin requires a new diaper," may be expressed or displayed by the video system.

Similarly, the systems and methods of the present disclosure may be utilized to accept and interpret one or more motions, gestures and/or mannerisms in environments where the level of ambient noise is so sufficiently high that oral communication is difficult or impossible. For example, where a stock trader is observed performing one or more recognized gestures on a live trading floor, the systems and methods of the present disclosure may be utilized to receive and execute one or more trading orders in response to the recognized gestures. Additionally, where an athletic coach attempts to provide hand signals for delivering a confidential instruction to one or more players over a substantial distance (e.g., a third base coach providing signals to a hitter or baserunner in baseball, or a coordinator providing position alignment and formations to a football team), the systems and methods of the present disclosure may be utilized to observe the athletic coach's motions, gestures and/or mannerisms, to monitor the players' response to the observed motions, gestures and/or mannerisms, and to derive the coach's instructions from future like motions, gestures and/or mannerisms.

Finally, the systems and methods of the present disclosure may be utilized to automatically place an order for one or more items at a bar or restaurant. A video system may record a customer requesting one or more items at a restaurant through the use of gestures, and may convert the customer's gestures into an express set of instructions to be executed by a kitchen staff. The staff may then prepare one or more orders in accordance with the instructions, and the food may be delivered to the customer who ordered the food.

It should be understood that, unless otherwise explicitly or implicitly indicated herein, any of the features, characteristics, alternatives or modifications described regarding a particular embodiment herein may also be applied, used, or incorporated with any other embodiment described herein. Also, the drawings herein are not drawn to scale.

Conditional language, such as, among others, "can," "could," "might," or "may," unless specifically stated otherwise, or otherwise understood within the context as used, is generally intended to convey that certain embodiments could include, but do not require, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described and illustrated with respect to exemplary embodiments thereof, the foregoing and various other additions and omissions may be made therein and thereto without departing from the spirit and scope of the present disclosure.

What is claimed is:

1. A non-transitory computer-readable medium having a computer-executable component which causes a computer system to perform a method enabling an online marketplace to process an order using sign language, the method comprising:
   causing a display of information pertaining to at least one item on a first user interface using the at least one processor;
   generating a query for a response related to the at least one item;
   receiving video data from a customer in response to the query, the video data comprising a sequence of activity;
   analyzing the video data to identify at least one gesture by the customer included in the sequence of activity;
   identifying at least one phrase as related to the at least one gesture by the customer;
   causing a display of the at least one phrase on a second user interface;
   requesting a confirmation from the customer that the at least one phrase corresponds to the at least one gesture by the customer included in the sequence of activity;
   determining whether the confirmation is received from the customer within a predetermined time period;
   if the confirmation is received from the customer within the predetermined time period, processing the order for the at least one item; and
   if the confirmation is not received from the customer within the predetermined time period, requesting a phrase corresponding to the at least one gesture from the customer.

2. The non-transitory computer-readable medium of claim 1, further comprising:
   searching a dictionary for a plurality of potentially matching phrases corresponding to the at least one gesture by the customer included in the sequence of activity, wherein the dictionary comprises a plurality of gestures corresponding to a plurality of phrases;
   calculating a confidence interval for each of the plurality of potentially matching phrases; and
   selecting the one of the potentially matching phrases having the highest confidence interval as the at least one gesture by the customer.

3. The non-transitory computer-readable medium of claim 2, wherein the at least one phrase is identified based at least in part on a context of the query, and
wherein the context relates to at least one of an identity of the customer, a location of the customer, a purchasing history of the customer or the at least one item.

4. A computer-implemented method enabling an online marketplace to process an order using sign language from a customer, comprising:
causing a display of information relating to at least one product available at the online marketplace using at least one computer processor, wherein the information comprises at least one of a name of the at least one product, a price of the at least one product, a size of the at least one product or an image of the at least one product;
receiving a communication relating to the at least one product over a network from a customer in response to the display of the information, the communication including video imagery;
analyzing the video imagery to identify at least one gesture included in the video imagery;
determining at least one phrase as potentially corresponding to the at least one gesture according to a recognized sign language by the at least one computer processor;
requesting a confirmation from the customer that the at least one phrase corresponds to the at least one gesture by the customer included in the video imagery;
determining whether the confirmation is received from the customer within a predetermined time period;
if the confirmation is received from the customer within the predetermined time period, processing the order for the at least one product; and
if the confirmation is not received from the customer within the predetermined time period, requesting a phrase corresponding to the at least one gesture from the customer.

5. The computer-implemented method according to claim 4, wherein identifying the at least one phrase as potentially corresponding to the at least one gesture according to the recognized sign language further comprises:
searching a library for information corresponding to the at least one gesture,
wherein the library includes a plurality of phrases corresponding to a plurality of gestures according to the recognized sign language.

6. The computer-implemented method according to claim 4, wherein identifying at least one phrase as potentially corresponding to the at least one gesture according to a recognized sign language further comprises:
identifying a plurality of phrases as potentially corresponding to the at least one gesture, and
wherein the method further comprises:
calculating a confidence interval for each of the plurality of phrases with respect to the at least one gesture;
ranking the plurality of phrases according to the confidence intervals; and
causing a display of at least some of the plurality of phrases ranked according to the confidence intervals using the at least one computer processor,
wherein the confidence interval is a measure of a probability that one of the plurality of phrases corresponds to the at least one gesture according to the recognized sign language.

7. The computer-implemented method according to claim 4, wherein identifying the at least one phrase as potentially corresponding to the at least one gesture according to a recognized sign language further comprises:
identifying a plurality of phrases as potentially corresponding to the at least one gesture, and
wherein the method further comprises:
calculating a confidence interval for each of the plurality of phrases with respect to the at least one gesture;
identifying one of the plurality of phrases having a highest confidence interval; and
causing a display of the one of the plurality of phrases having the highest confidence interval.

8. The computer-implemented method according to claim 4, wherein identifying the at least one phrase as potentially corresponding to the at least one gesture according to a recognized sign language further comprises:
determining a context of the communication; and
identifying the at least one phrase as potentially corresponding to the at least one gesture according to the recognized sign language based at least in part on the context of the communication.

9. The computer-implemented method according to claim 8, wherein the context relates to at least one of an identity of the customer, a location of the customer, a dialect associated with the customer, an idiolect associated with the customer, or the at least one product.

10. The computer-implemented method according to claim 8, wherein the context relates to at least one of a product that was previously purchased by the customer, a product that was previously considered for purchase by the customer, a product that was previously viewed by the customer or a category of products including a product that was previously purchased by the customer.

11. The computer-implemented method according to claim 4, further comprising:
if the confirmation is received from the customer prior to the predetermined time,
updating the library to indicate that the at least one phrase corresponds to the at least one gesture.

12. The computer-implemented method according to claim 4, wherein the video imagery is captured using at least one camera associated with the at least one computer processor.

13. The computer-implemented method according to claim 12, wherein the video imagery is captured using two cameras,
wherein each of the two cameras captures the video imagery from a different perspective,
wherein the method further comprises:
obtaining a stereoscopic impression of the video imagery using the at least one computer processor,
wherein the at least one phrase is identified as potentially corresponding to the at least one gesture based at least in part on the stereoscopic impression.

14. The computer-implemented method according to claim 4, wherein the at least one gesture comprises at least one facial expression or at least one movement of at least one hand.

15. The computer-implemented method according to claim 4, wherein the recognized sign language is the American Sign Language.

16. A computer-implemented method enabling an online marketplace to process an order using sign language from a customer, comprising:
receiving a request for service from a customer over a network, the request including a first set of video imagery;
analyzing the request for service to identify a first gesture expressed in the first set of video imagery;
translating, by a computer processor, the first gesture into at least a first phrase according to a sign language;
preparing a response to the request for service based at least in part on the first phrase;

transmitting the response to the customer, the response including a second set of video imagery;

causing a display of the second set of video imagery to the customer, wherein the second set of video imagery comprises a request for a confirmation that at least the first phrase corresponds to at least the first gesture by the customer included in the first set of video imagery;

determining whether the confirmation is received from the customer within a predetermined time period;

if the confirmation is received from the customer within the predetermined time period, processing the order for the at least one product; and if the confirmation is not received from the customer within the predetermined time period, requesting a phrase corresponding to the first gesture from the customer.

17. The computer-implemented method according to claim 16, wherein translating the first gesture into at least the first phrase according to the sign language further comprises:
   identifying a context of the request for service; and
   translating the first gesture into at least a second phrase based at least in part on the context of the request for service, and
   wherein the context of the request for service relates to at least one of a location of the customer, an item purchased by the customer, a dialect associated with the customer, an idiolect associated with the customer, at least one item previously purchased by the customer or at least one item previously considered for purchase by the customer.

18. The computer-implemented method according to claim 16,
   wherein at least a second gesture is expressed in the second set of video imagery, and
   wherein at least the second gesture corresponds to at least a second phrase according to the sign language.

19. The computer-implemented method according to claim 16, wherein the second set of video imagery comprises a text-based message.

20. A mobile computer device configured to interact with an online marketplace for processing an order using sign language from a customer, comprising:
   at least one computer processor;
   at least one data store; and
   at least one camera,
   wherein the mobile computer device is connected to a network, and
   wherein the mobile computer device is configured with a computer program which when executed causes the mobile device to perform a method comprising:
      capturing a video data file depicting a user performing at least one gesture using the at least one camera;
      analyzing the video data file to recognize the at least one gesture;
      searching a library for at least one word potentially corresponding to the at least one gesture according to a recognized sign language;
      requesting a confirmation from the user that the at least one word corresponds to the at least one gesture;
      determining whether the confirmation is received from the user within a predetermined time period;
      if the confirmation is received from the user within the predetermined time period, processing the order for the at least one product; and
      if the confirmation is not received from the user within the predetermined time period, requesting a phrase corresponding to the at least one gesture from the user.

21. The mobile computer device according to claim 20, wherein searching the library for the at least one word potentially corresponding to the at least one gesture further comprises: determining a context associated with the video data file; and selecting the library based at least in part on the context of the video data file.

22. The mobile computer device according to claim 21,
   wherein the context relates to at least one of a location of the user, an item purchased by the user, a purchasing history of the user, a dialect associated with the user or an idiolect associated with the user.

23. The computer-implemented method of claim 4, further comprising:
   if the confirmation is not received from the customer within the predetermined time period,
   updating the library to indicate that the at least one phrase does not correspond to the at least one gesture.

* * * * *